(12) United States Patent
Li et al.

(10) Patent No.: US 12,507,234 B2
(45) Date of Patent: Dec. 23, 2025

(54) UPLINK PREEMPTION FOR MULTI-SLOT UCI MULTIPLEXING

(71) Applicants: QUALCOMM Incorporated, San Diego, CA (US); Qiaoyu Li, Beijing (CN); Chao Wei, Beijing (CN); Jing Lei, San Diego, CA (US)

(72) Inventors: Qiaoyu Li, Beijing (CN); Chao Wei, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 17/757,515

(22) PCT Filed: Jan. 9, 2020

(86) PCT No.: PCT/CN2020/071092
§ 371 (c)(1),
(2) Date: Jun. 16, 2022

(87) PCT Pub. No.: WO2021/138864
PCT Pub. Date: Jul. 15, 2021

(65) Prior Publication Data
US 2023/0011162 A1 Jan. 12, 2023

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ................ H04W 72/1268; H04W 72/1289
See application file for complete search history.

(56) References Cited

U.S. PATENT DOCUMENTS

| 10,455,587 | B2 * | 10/2019 | Seo ................. H04W 72/56 |
| 11,743,892 | B2 * | 8/2023 | Zhao ................ H04L 1/0073 370/329 |

(Continued)

FOREIGN PATENT DOCUMENTS

| CN | 107734680 A | 2/2018 |
| CN | 110661607 A | 1/2020 |

(Continued)

OTHER PUBLICATIONS

International Search Report and Written Opinion—PCT/CN2020/071092—ISA/EPO—Oct. 10, 2020.

(Continued)

*Primary Examiner* — Parth Patel
(74) *Attorney, Agent, or Firm* — Harrity & Harrity, LLP

(57) ABSTRACT

Various aspects of the present disclosure generally relate to wireless communication. In some aspects, a user equipment (UE) may receive an uplink cancellation indication that identifies one or more first time-domain resources during which the UE is to refrain from transmitting at least a portion of a physical uplink shared channel (PUSCH) transmission scheduled to be transmitted during the one or more first time-domain resources. The UE may identify one or more second time-domain resources during which the UE is to transmit the at least the portion of the PUSCH transmission or another portion of the PUSCH transmission. The UE may transmit, based at least in part on receiving the uplink cancellation indication, the at least the portion of the PUSCH transmission or the other portion of the PUSCH transmission during the one or more second time-domain resources. Numerous other aspects are provided.

30 Claims, 10 Drawing Sheets

(56) References Cited

U.S. PATENT DOCUMENTS

| | | | |
|---|---|---|---|
| 2016/0337157 A1* | 11/2016 | Papasakellariou | H04L 1/1893 |
| 2019/0037586 A1* | 1/2019 | Park | H04L 5/00 |
| 2019/0044649 A1* | 2/2019 | Kim | H04L 1/00 |
| 2019/0081763 A1 | 3/2019 | Akkarakaran et al. | |
| 2019/0141731 A1* | 5/2019 | Yoshimoto | H04W 72/12 |
| 2019/0158334 A1* | 5/2019 | Kim | H04L 5/0037 |
| 2019/0199420 A1* | 6/2019 | Faxér | H04L 5/0057 |
| 2019/0230683 A1 | 7/2019 | Akkarakaran et al. | |
| 2019/0254067 A1* | 8/2019 | Al-Imari | H04W 72/1268 |
| 2019/0306848 A1* | 10/2019 | Zhou | H04W 72/20 |
| 2019/0306922 A1 | 10/2019 | Xiong et al. | |
| 2019/0327755 A1* | 10/2019 | Xiong | H04L 5/0046 |
| 2019/0349927 A1* | 11/2019 | Qin | H04W 72/0446 |
| 2019/0356446 A1* | 11/2019 | Kim | H04L 5/0053 |
| 2020/0008189 A1* | 1/2020 | Yin | H04L 1/1858 |
| 2020/0015119 A1* | 1/2020 | Takeda | H04L 1/1864 |
| 2020/0068599 A1* | 2/2020 | Yang | H04L 5/0055 |
| 2020/0137736 A1* | 4/2020 | Du | H04L 5/0053 |
| 2020/0163080 A1* | 5/2020 | Takeda | H04L 5/0053 |
| 2020/0383144 A1* | 12/2020 | Sun | H04L 5/0094 |
| 2021/0007119 A1* | 1/2021 | Li | H04W 74/0816 |
| 2021/0014029 A1* | 1/2021 | Jiao | H04W 72/23 |
| 2021/0014866 A1* | 1/2021 | Shi | H04W 72/53 |
| 2021/0037591 A1* | 2/2021 | Niu | H04L 5/0055 |
| 2021/0058948 A1* | 2/2021 | Zhao | H04L 1/0073 |
| 2021/0144702 A1* | 5/2021 | Zhao | H04W 72/23 |
| 2021/0168794 A1* | 6/2021 | Zhang | H04L 5/0044 |
| 2021/0176758 A1* | 6/2021 | Bae | H04L 1/1864 |
| 2021/0185543 A1* | 6/2021 | Xu | H04L 5/0048 |
| 2021/0219276 A1* | 7/2021 | Liu | H04W 72/0446 |
| 2021/0307079 A1* | 9/2021 | Xu | H04W 72/044 |
| 2021/0321392 A1* | 10/2021 | Hooli | H04L 5/001 |
| 2022/0045792 A1* | 2/2022 | Song | H04L 1/08 |
| 2022/0110138 A1* | 4/2022 | Miao | H04W 72/1273 |
| 2022/0159706 A1* | 5/2022 | Panteleev | H04L 1/08 |
| 2022/0191802 A1* | 6/2022 | Koorapaty | H04W 52/34 |
| 2022/0217736 A1* | 7/2022 | Taherzadeh Boroujeni | H04L 5/0094 |
| 2022/0217750 A1* | 7/2022 | Liu | H04W 72/21 |
| 2022/0272557 A1* | 8/2022 | Liu | H04W 72/0446 |
| 2022/0386243 A1* | 12/2022 | Liang | H04W 72/23 |
| 2023/0011162 A1* | 1/2023 | Li | H04W 72/1268 |
| 2023/0023719 A1* | 1/2023 | Ji | H04W 16/28 |
| 2024/0048331 A1* | 2/2024 | Shimomura | H04L 5/0053 |

FOREIGN PATENT DOCUMENTS

| | | |
|---|---|---|
| WO | 2019191977 A1 | 10/2019 |
| WO | WO-2019194664 A1 | 10/2019 |

OTHER PUBLICATIONS

Nokia., et al., "Summary of Contributions on UL/DL Intra-UE Prioritization/Multiplexing", 3GPP TSG-RAN WG1 #96, R1-1903369, Athens, Greece, Feb. 25-Mar. 1, 2019, Feb. 26, 2019 (Feb. 26, 2019) Section 2.3, 25 Pages.

Nokia, et al., "Solution for UL inter-UE multiplexing between eMBB and Urllc", 3GPP TSG-RAN WG1 AH#1901, R1-1900931, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 24, 2019, Jan. 20, 2019, 11 Pages, XP051593775, The whole document.

Supplementary European Search Report—EP20912441—Search Authority—The Hague—Sep. 6, 2023.

* cited by examiner

UPLINK PREEMPTION FOR MULTI-SLOT UCI MULTIPLEXING

CROSS-REFERENCE TO RELATED APPLICATION

This application is a 371 national stage of Patent Cooperation Treaty (PCT) Application No. PCT/CN2020/071092 filed on Jan. 9, 2020, entitled "UPLINK PREEMPTION FOR MULTI-SLOT UCI MULTIPLEXING," which is hereby expressly incorporated by reference herein.

FIELD OF THE DISCLOSURE

Aspects of the present disclosure generally relate to wireless communication and to techniques and apparatuses for uplink preemption for multi-slot uplink control information (UCI) multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an uplink cancellation indication that identifies one or more first time-domain resources during which the UE is to refrain from transmitting at least a portion of a physical uplink shared channel (PUSCH) transmission scheduled to be transmitted during the one or more first time-domain resources, wherein the PUSCH transmission is a multi-slot transmission carrying multiplexed uplink control information; identifying one or more second time-domain resources, subsequent to the one or more first time-domain resources, during which the UE is to transmit the at least the portion of the PUSCH transmission or another portion of the PUSCH transmission; and transmitting, based at least in part on receiving the uplink cancellation indication, the at least the portion of the PUSCH transmission or the other portion of the PUSCH transmission during the one or more second time-domain resources.

In some aspects, a method of wireless communication, performed by a UE, may include receiving an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information in a payload of the PUSCH transmission; determining, based at least in part on a priority associated with the payload of the PUSCH transmission, whether to transmit the at least the portion of the PUSCH transmission during one or more second time-domain resources subsequent to the one or more first time-domain resources; and selectively transmitting the at least the portion of the PUSCH transmission during the one or more second time-domain resources based at least in part on determining whether to transmit the at least the portion of the PUSCH transmission during the one or more second time-domain resources.

In some aspects, a UE for wireless communication may include memory and one or more processors operatively coupled to the memory. The memory and the one or more processors may be configured to receive an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information; identify one or more second time-domain resources, subsequent to the one or more first time-domain resources, during which the UE is to transmit the at least the portion of the PUSCH transmission or another portion of the PUSCH transmission; and transmit, based at least in part on receiving the uplink cancellation indication, the at least the portion of the PUSCH transmission or the other portion of the PUSCH transmission during the one or more second time-domain resources.

In some aspects, a UE for wireless communication may include memory and one or more processors operatively coupled to the memory. The memory and the one or more processors may be configured to receive an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information in a payload of the PUSCH transmission; determine, based at least in part on a priority associated with the payload of the PUSCH transmission, whether to transmit the at least the portion of the PUSCH transmission during one or more second time-domain resources subsequent to the one or more first time-domain resources; and selectively transmit the at least the portion of the PUSCH transmission during the one or more second time-domain resources based at least in part on determining whether to transmit the at least the portion of the PUSCH transmission during the one or more second time-domain resources.

In some aspects, a non-transitory computer-readable medium may store one or more instructions for wireless communication. The one or more instructions, when executed by one or more processors of a UE, may cause the one or more processors to: receive an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information; identify one or more second time-domain resources, subsequent to the one or more first time-domain resources, during which the UE is to transmit the at least the portion of the PUSCH transmission or another portion of the PUSCH transmission; and transmit, based at least in part on receiving the uplink cancellation indication, the at least the portion of the PUSCH transmission or the other portion of the PUSCH transmission during the one or more second time-domain resources.

In some aspects, a non-transitory computer-readable medium may store one or more instructions for wireless communication. The one or more instructions, when executed by one or more processors of a UE, may cause the one or more processors to: receive an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information in a payload of the PUSCH transmission; determine, based at least in part on a priority associated with the payload of the PUSCH transmission, whether to transmit the at least the portion of the PUSCH transmission during one or more second time-domain resources subsequent to the one or more first time-domain resources; and selectively transmit the at least the portion of the PUSCH transmission during the one or more second time-domain resources based at least in part on determining whether to transmit the at least the portion of the PUSCH transmission during the one or more second time-domain resources.

In some aspects, an apparatus for wireless communication may include means for receiving an uplink cancellation indication that identifies one or more first time-domain resources during which the apparatus is to refrain from transmitting at least a portion of a PUSCH transmission scheduled to be transmitted during the one or more first time-domain resources, wherein the PUSCH transmission is a multi-slot transmission carrying multiplexed uplink control information; means for identifying one or more second time-domain resources, subsequent to the one or more first time-domain resources, during which the apparatus is to transmit the at least the portion of the PUSCH transmission or another portion of the PUSCH transmission; and means for transmitting, based at least in part on receiving the uplink cancellation indication, the at least the portion of the PUSCH transmission or the other portion of the PUSCH transmission during the one or more second time-domain resources.

In some aspects, an apparatus for wireless communication may include means for receiving an uplink cancellation indication that identifies one or more first time-domain resources during which the apparatus is to refrain from transmitting at least a portion of a PUSCH transmission scheduled to be transmitted during the one or more first time-domain resources, wherein the PUSCH transmission is a multi-slot transmission carrying multiplexed uplink control information in a payload of the PUSCH transmission; means for determining, based at least in part on a priority associated with the payload of the PUSCH transmission, whether to transmit the at least the portion of the PUSCH transmission during one or more second time-domain resources subsequent to the one or more first time-domain resources; and means for selectively transmitting the at least the portion of the PUSCH transmission during the one or more second time-domain resources based at least in part on determining whether to transmit the at least the portion of the PUSCH transmission during the one or more second time-domain resources.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
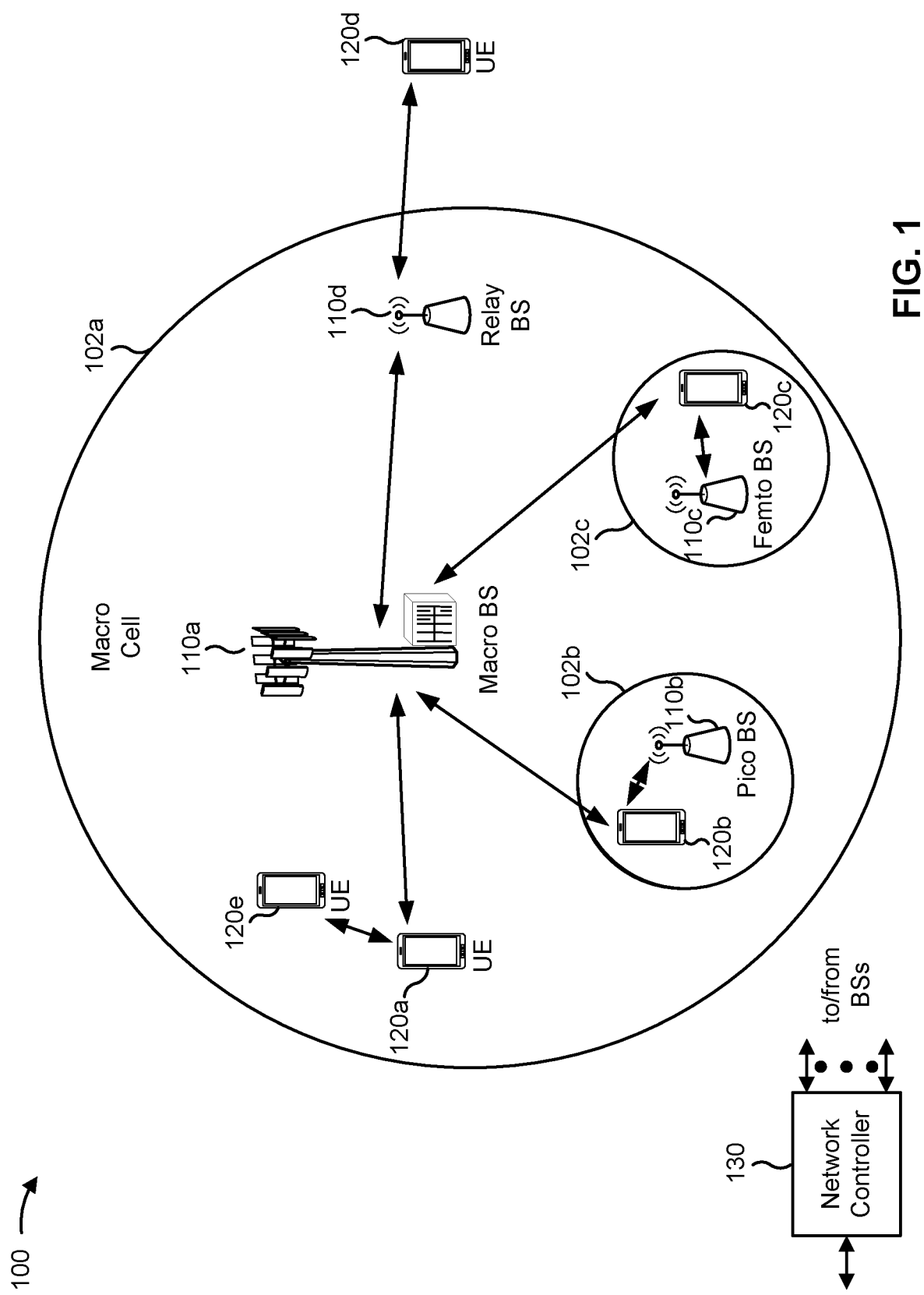
- FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "A", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
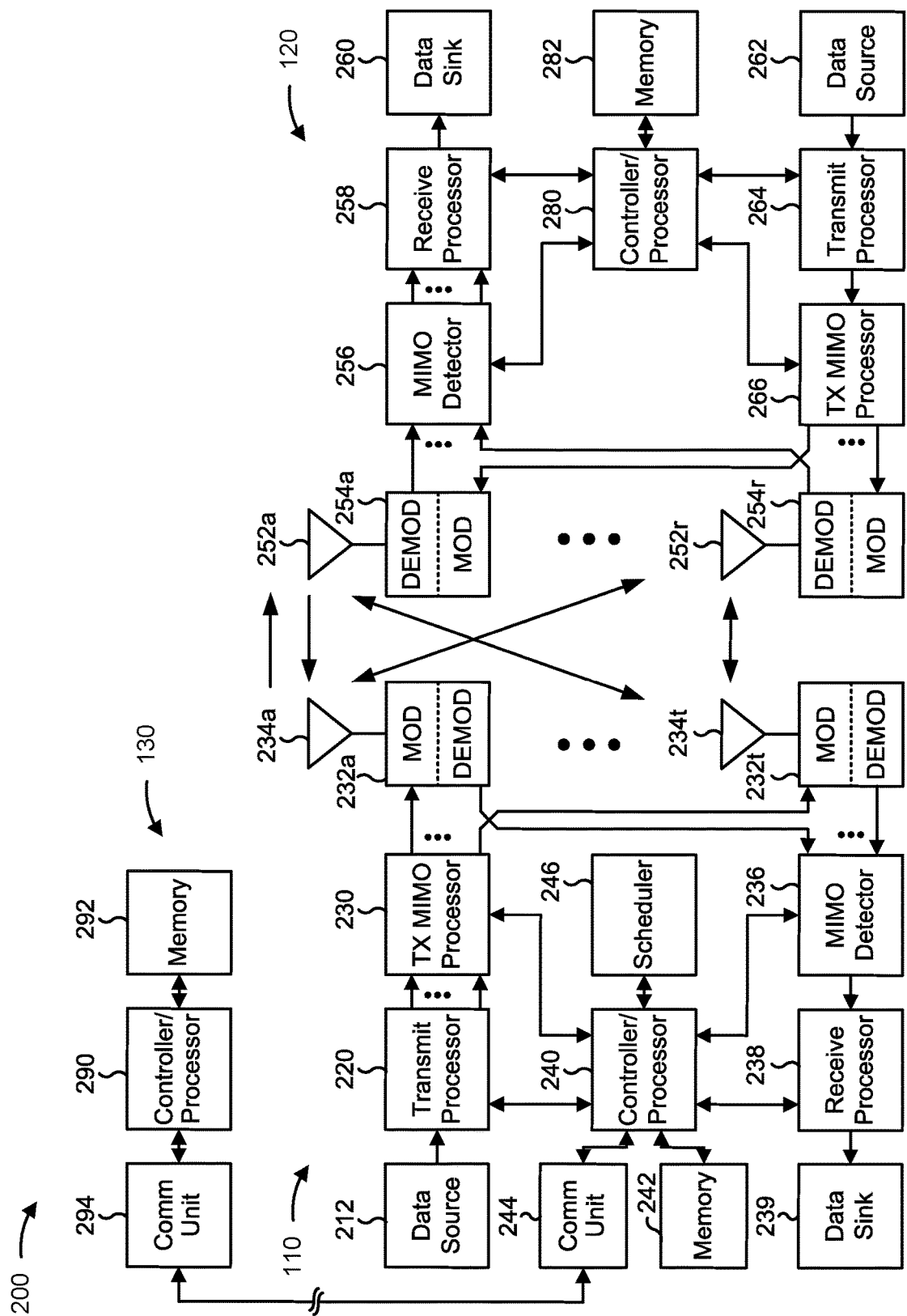
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink preemption for multi-slot uplink control information (UCI) multiplexing, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for receiving an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information, means for identifying one or more second time-domain resources, subsequent to the one or more first time-domain resources, during which the UE is to transmit the at least the portion of the PUSCH transmission or another portion of the PUSCH transmission, means for transmitting, based at least in part on receiving the uplink cancellation indication, the at least the portion of the PUSCH transmission or the other portion of the PUSCH transmission during the one or more second time-domain resources, and/or the like. In some aspects, UE 120 may include means for receiving an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information in a payload of the PUSCH transmission, means for determining, based at least in part on a priority associated with the payload of the PUSCH transmission, whether to transmit the at least the portion of the PUSCH transmission during one or more second time-domain resources subsequent to the one or more first time-domain resources, means for selectively transmitting the at least the portion of the PUSCH transmission during the one or more second time-domain resources based at least in part on determining whether to transmit the at least the portion of the PUSCH transmission during the one or more second time-domain resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Many devices, such as smart wearable devices, industrial sensors, and video surveillance devices, may use NR-light. NR-light operates with NR but with reduced transmission power, reduced computational complexity, longer battery life, and/or a reduced quantity of transmission and reception antennas as compared to NR. NR-light UEs may also use reduced transmission and reception bandwidth. For example, an NR-light UE may use a bandwidth of 5 MHz-20 MHz as compared to an NR premium UE that uses a bandwidth of 100 MHz. In some aspects, network design is concerned with co-existence of NR premium UEs and NR-light UEs.

An NR-Light UE (e.g., a UE 120) may provide uplink control information (UCI) to a BS (e.g., a gNB or BS 110). The UCI may include feedback about a transmission, transmission conditions, or information that may include feedback to a BS. For example, the UCI may include one or more components. The components may include hybrid automatic repeat request (HARQ) feedback and/or a channel state information (CSI) report. The CSI report may include multiple parts, such as a CSI-part 1 and a CSI-part 2. To reduce overhead of transmitting multiple parts of CSI, an NR-Light UE may multiplex uplink scheduled (UL-SCH) data with UCI on a PUSCH. In this way, the overhead for multiple CSI parts that would have otherwise resulted from multiple radio resource control (RRC) configurations for the different parts, the downlink control information (DCI) overhead for triggering the different CSI parts, and/or the like, may be reduced.

A BS may allocate resource elements (REs) for multiplexed UCI components. The BS may dynamically schedule or indicate a quantity of REs for each UCI component. The BS may use some parameters called Beta-Offsets to determine a quantity of REs for each UCI part. The BS may also use a scaling factor A to alter a ratio of UCI and UL-SCH data in the PUSCH. In an example, the UE may first determine a quantity of REs for HARQ-ACK as $Q_{ACK} = \min\{Q_{Beta-ACK}, \lceil A \times Q_{PUSCH} \rceil\}$, where $Q_{Beta-ACK}$ is a quantity of REs determined by the Beta-Offset value for HARQ-ACK. $Q_{PUSCH}$ may be a total quantity of REs of a scheduled PUSCH slot (excluding REs for reference signals). The UE may then determine a quantity of REs for CSI-Part1 and CSI-Part2 as $Q_{Part-1} = \min\{Q_{Beta-Part1}, \lceil A \times Q_{PUSCH} \rceil - Q_{ACK}\}$ and $Q_{Part-2} = \min\{Q_{Beta-Part2}, \lceil A \times Q_{PUSCH} \rceil - Q_{ACK} - Q_{Part1}\}$, where $Q_{Beta-Part1}$ and $Q_{Beta-Part2}$ are a quantity of REs determined by the Beta-Offset values for CSI-Part1 and CSI-Part2, respectively. A quantity of REs that remain for UL-SCH data may be $Q_{UL-SCH} = Q_{PUSCH} - Q_{ACK} - Q_{Part1} - Q_{Part2}$. The UE may sequentially map payloads of UCI components and UL-SCH data to the quantity of REs determined as above. A scheduling priority for a PUSCH slot may be HARQ-ACK>CSI-report-Part1>CSI-report-Part2>UL-SCH data.

A UE may determine a channel coding rate of a HARQ-ACK according to a quantity of HARQ-ACK information bits, a modulation order, and a quantity of REs for HARQ-ACK (i.e., $Q_{ACK}$). The UE may determine a channel coding rate of a CSI-Part1 similarly as a channel coding rate of a HARQ-ACK (no omission). CSI-Part2 may have a target channel coding rate that depends on whether UL-SCH data is multiplexed on the PUSCH or not. If UL-SCH data is also multiplexed on the PUSCH, $Q_{Beta-Part2} = \lceil (O_{Part2} + L_{Part2}) \times \beta_{Part2} \times Q_{PUSCH} / K_{tot} \rceil$, where $K_{tot}$ is the sum CB size across all UL-SCH data to be multiplexed onto the PUSCH, $O_{Part2}$ is the CSI-Part2 payload size, $L_{Part2}$ is a quantity of cyclic redundancy check (CRC) bits for CSI-Part2, and $\beta_{Part2}$ is the Beta_Offset value for CSI-Part2. If $Q_{Beta-Part2} > \lceil A \times Q_{PUSCH} \rceil - Q_{ACK} - Q_{Part1}$, CSI-Part2 has to be omitted level by level (according to some priority rules), until $Q_{Beta-Part2} \leq \lceil A \times Q_{PUSCH} \rceil - Q_{ACK} - Q_{Part1}$. If UL-SCH data is not multiplexed on the PUSCH, the UE may determine a target coding rate for CSI-Part2 by $C_T = C_{MCS}/\beta_{Part2}$, where $C_{MCS}$ is a signaled coding rate in UL grant DCI. If the coding rate for CSI-Part2 is greater than $C_T$, CSI-Part2 has to be omitted until the coding rate is lower than $C_T$.

In some cases, an NR-Light UE may be scheduled to perform a multi-slot PUSCH transmission. In this case, the PUSCH transmission may span a plurality of time-domain resources (e.g., may span a plurality of slots, may include one or more symbols in each of the plurality of slots, and/or the like). In each time-domain resource, the UE may transmit a portion of the PUSCH transmission, and the payload of the PUSCH transmission that is transmitted each time-domain resource may be the same payload type or a different payload type relative to the payloads transmitted in other time-domain resources. The payload types may include UL-SCH data, various types of UCI multiplexed with or without UL-SCH data, and/or the like.

In some cases, a multi-slot PUSCH transmission of a UE may overlap or collide with another PUSCH transmission of another UE. In this case, if the other PUSCH transmission is a time-sensitive or high-priority transmission, a BS may transmit an uplink cancellation indication (which also may be referred to as UL preemption cancellation, a PUSCH cancellation indication, or as other terms). As an example, if the multi-slot PUSCH transmission carries enhanced mobile broadband (eMBB) traffic and the other PUSCH transmission carries ultra reliable low latency communication (URLLC) traffic, the BS may transmit the uplink cancellation indication to cause the UE to refrain from transmitting one or more portions of the multi-slot PUSCH transmission such that the overlap or collision with the other PUSCH transmission is avoided.

However, if the UE refrains from transmitting portions of the multi-slot PUSCH transmission, the BS may not be able to decode the multi-slot PUSCH transmission without the missing portions. Moreover, the missing portions may contain important multiplexed UCI, such as HARQ feedback and/or CSI reporting, which may result in the BS being unable to perform HARQ retransmissions and/or unable to adjust channel parameters for improved downlink communication.

Some aspects described herein provide techniques and apparatuses for uplink preemption for multi-slot uplink UCI multiplexing. In some aspects, a UE may receive an uplink cancellation indication. The uplink cancellation indication may identify one or more first time-domain resources during which the UE is to refrain from transmitting at least a portion of a multi-slot PUSCH transmission scheduled to be transmitted during the one or more first time-domain resources. The UE may be capable of identifying one or more second time-domain resources during which to transmit the at least the portion of the PUSCH transmission (or another portion of the PUSCH transmission), may be capable of determining whether to transmit the at least the portion of the PUSCH transmission during the one or more second time-domain resources based at least in part on a priority associated with the payload of the PUSCH transmission, and/or the like. In this way, the UE is capable of transmitting portions of a multi-slot PUSCH transmission, that were cancelled by an uplink cancellation indication, in subsequent time-domain resources. Thus, the BS to which the UE transmits the multi-slot PUSCH transmission may receive more (or all) portions of a multi-slot PUSCH transmission than if the UE were to simply drop the portions, which increases the likelihood that the BS will be able to decode the multi-slot PUSCH transmission. Moreover, if the portions of the multi-slot PUSCH transmission that are transmitted in the subsequent time-domain resources include multiplexed UCI, the BS may receive the UCI and may perform HARQ retransmissions based at least in part on the UCI, may adjust channel parameters for improved downlink communication based at least in part on the UCI, and/or the like.

Figure 3A:
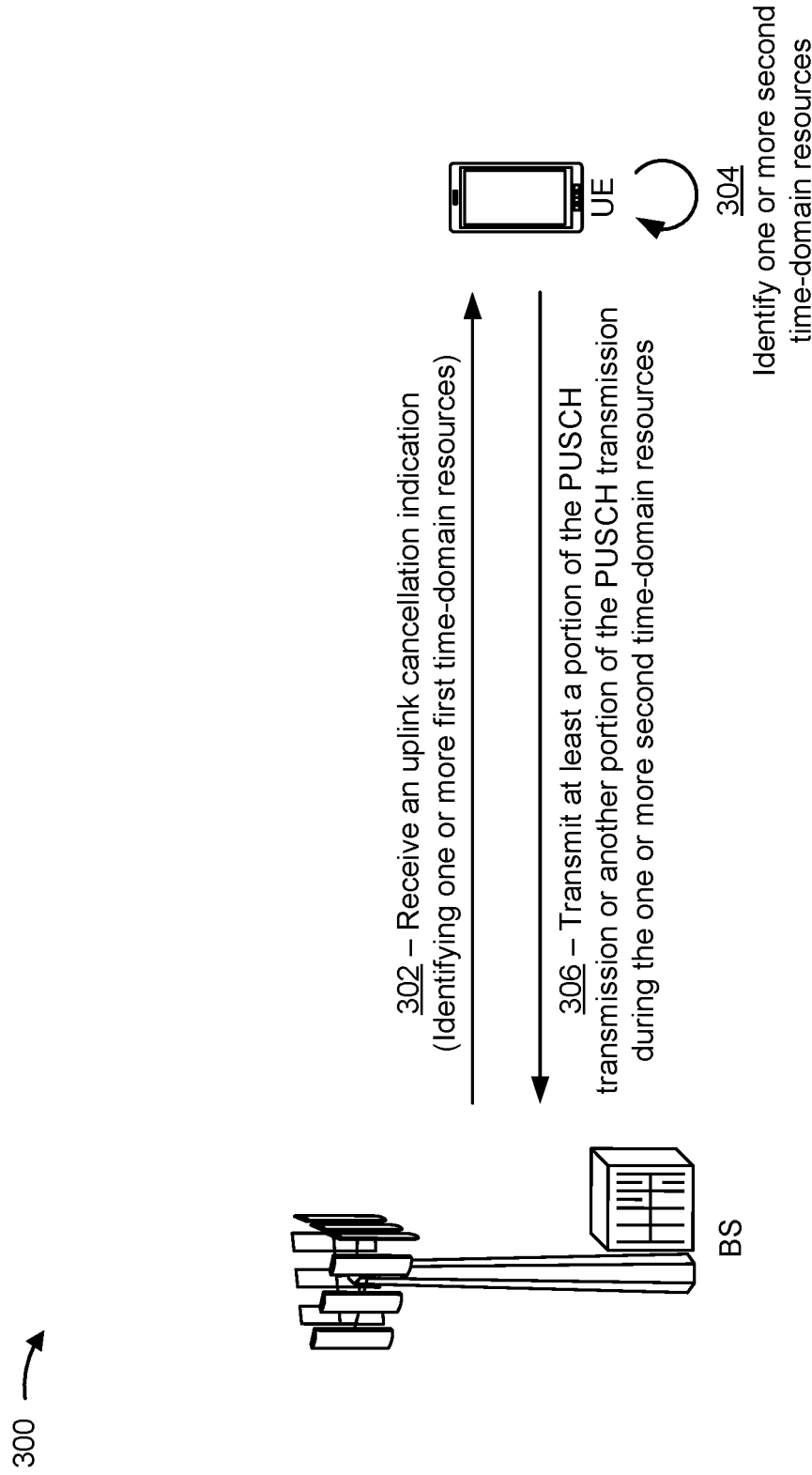
FIGS. 3A-3C and 4A-4C are diagrams illustrating examples of uplink preemption for multi-slot uplink control information multiplexing, in accordance with various aspects of the present disclosure.
Figure 3B:
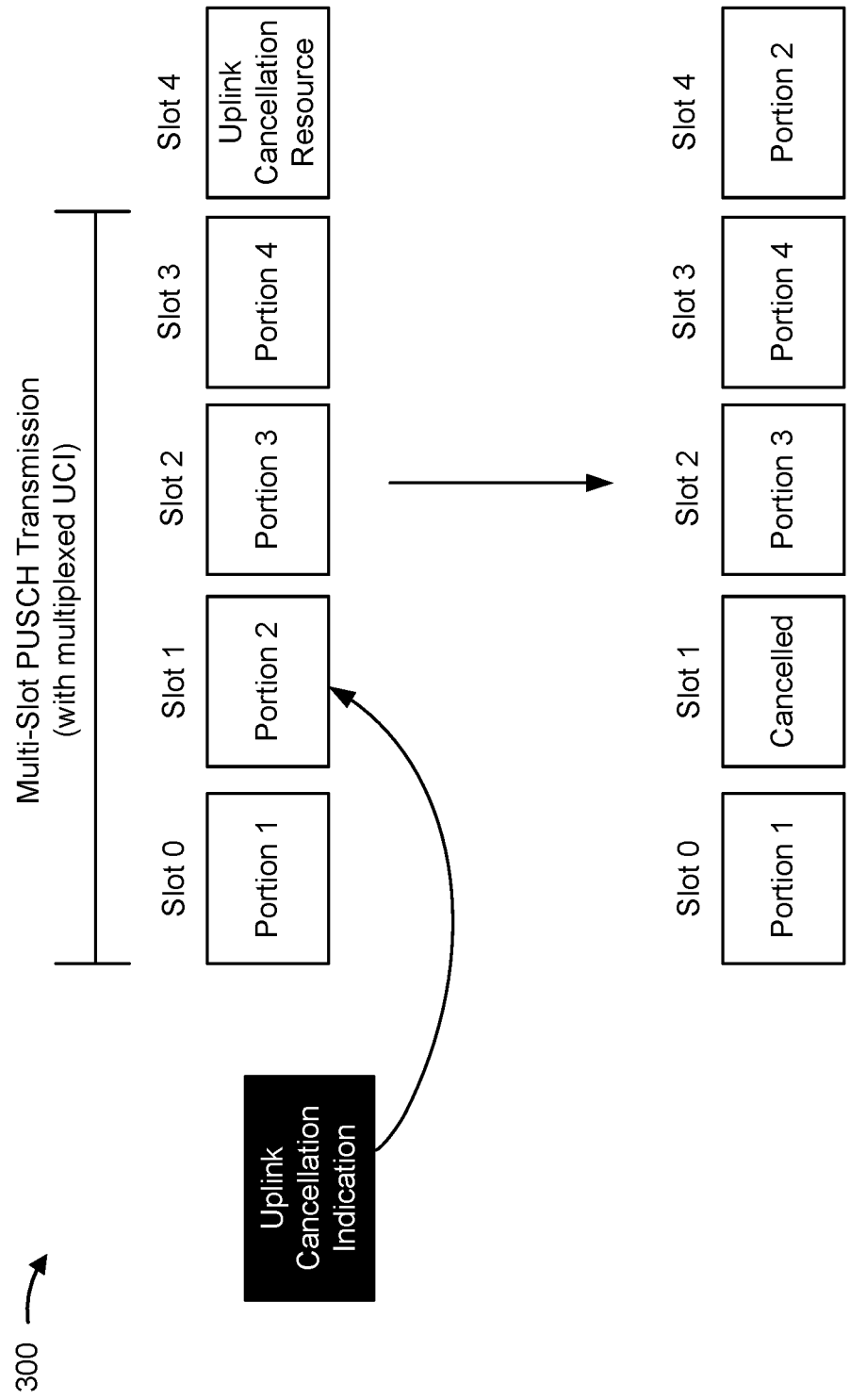
Figure 3C:
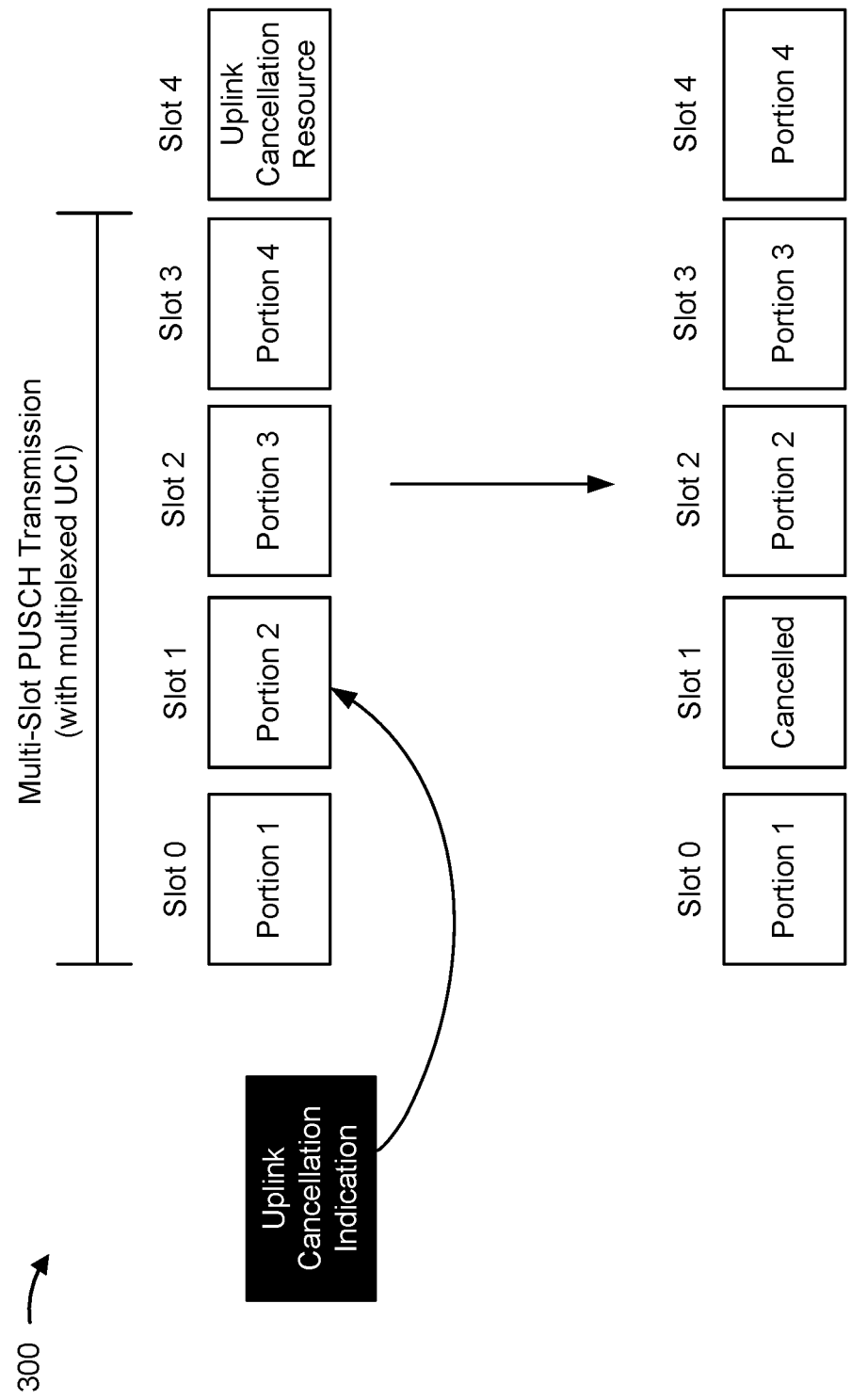

FIGS. 3A-3C are diagrams illustrating one or more examples 300 of uplink preemption for multi-slot uplink UCI multiplexing, in accordance with various aspects of the present disclosure. As shown in FIGS. 3A-3C, example(s) 300 may include communication between a UE (e.g., a UE 120) and a BS (e.g., a BS 110). In some aspects, the UE and the BS may be included in a wireless network (e.g., wireless network 100). In some aspects, the UE and the BS may communicate via an access link, which may include a downlink and an uplink.

In some aspects, the UE may be an NR-Light UE (which may also be referred to as a reduced capability UE), and may multiplex UCI in a PUSCH transmission (e.g., with other UCI, with UL-SCH data, and/or the like), and may transmit the PUSCH transmission to the BS on the uplink. In some aspects, the PUSCH transmission may be a multi-slot PUSCH transmission that spans a plurality of slots or other types of time-domain resources. In this case, the UE may transmit different types of payloads of multi-slot PUSCH transmissions in each. For example, the UE may transmit a HARQ feedback payload in a first slot, a CSI-Part1 payload in a second slot, a CSI-Part2 payload in a third slot, a UL-SCH data payload in a fourth slot, and/or the like.

In some aspects, the UE may be capable of transmitting various types of uplink traffic to the BS, such as eMBB traffic, URLLC traffic, and/or the like. In some cases, the UE may be configured or scheduled to transmit uplink traffic in a time-domain resource and/or a frequency-domain resource in which the uplink traffic overlaps with a higher priority uplink transmission or a time-sensitive transmission from another UE. As an example, the UE may be scheduled or configured to transmit eMBB traffic in a time-domain resource and/or a frequency-domain resource of a URLLC transmission from another UE.

As shown in FIG. 3A, and by reference number 302, the UE may receive an uplink cancellation indication that identifies one or more first time-domain resources during which the UE is to refrain from transmitting at least a portion of a multi-slot PUSCH transmission scheduled to be transmitted during the one or more first time-domain resources. In some aspects, the uplink cancellation indication may be included in an uplink grant (e.g., an uplink grant field) in a DCI communication.

The one or more first time-domain resources may be time-domain resources in which the portion of the PUSCH transmission overlaps or collides with another uplink transmission from another UE. For example, the one or more first time-domain resources may identify one or more slots in which the portion of the PUSCH transmission overlaps or collides with the other uplink transmission, may identify one or more symbols within a slot (or a plurality of slots) in which the portion of the PUSCH transmission overlaps or collides with the other uplink transmission, and/or the like.

As further shown in FIG. 3A, and by reference number 304, the UE may identify one or more second time-domain resources during which the UE is to transmit at least the portion of the PUSCH transmission and/or another portion of the PUSCH transmission. In some aspects, the one or more second time-domain resources may occur subsequent to the one or more first time-domain resources, such that the UE may refrain from transmitting the portion of the PUSCH transmission during the one or more first time-domain resources and may postpone the transmission of the portion of the PUSCH transmission to the one or more second time-domain resources.

In some aspects, the quantity of the one or more second time-domain resources may be based at least in part on the quantity of the one or more first time-domain resources. For example, if the UE is to refrain from transmitting the portion of the PUSCH transmission in a particular quantity of symbols and/or slots in the one or more first time-domain resources, the second time-domain resources may be scheduled or configured to include at least the same quantity of symbols and/or slots. In this way, the one or more second time-domain resources include a sufficient quantity of resources for the UE to postpone the transmission of the portion of the PUSCH transmission to the one or more second time-domain resources. In some aspects, the one or more first time-domain resources and the one or more second time-domain resources may be associated with the same frequency domain resource allocation and/or a same time domain resource allocation.

In some aspects, the UE may identify the one or more second time-domain resources based at least in part on a configuration for the UE. For example, the UE may be programmed and/or otherwise configured to be capable of identifying the one or more second time-domain resources based at least in part on the one or more first time-domain resources. In some aspects, the UE may identify the one or more second time-domain resources based at least in part on signaling received from the BS. In this case, the BS may explicitly indicate the one or more second time-domain resources to the UE in the uplink cancellation indication, in RRC signaling received from the BS, and/or the like.

As further shown in FIG. 3A, and by reference number 306, the UE may transmit at least the portion of the PUSCH transmission and/or another portion of the PUSCH transmission during the one or more second time-domain resources.

FIGS. 3B and 3C illustrate respective examples of transmitting at least the portion of the PUSCH transmission and/or another portion of the PUSCH transmission during the one or more second time-domain resources. Other example configurations of transmissions may be performed by the UE based at least in part on the techniques described herein.

As shown in FIG. 3B, the UE may be scheduled or configured to transmit portions 1 through 4 of a multi-slot PUSCH transmission across slots 0-3, respectively. The UE may receive an uplink cancellation indication from the BS, where the indication identifies slot 1 as cancelled. In this example, the UE may refrain from transmitting portion 1 in slot 1, and may postpone the transmission of portion 1 to slot 4, which may be an uplink cancellation resource scheduled for the purpose of the postponed transmission. In another example, if the one or more symbols in which portion 1 is to be transmitted in slot 1 are cancelled by the uplink cancellation indication, the UE may postpone the transmission of portion 1 to one or more symbols in slot 4.

As shown in FIG. 3C, the UE may be scheduled or configured to transmit portions 1 through 4 of a multi-slot PUSCH transmission across slots 0-3, respectively. The UE may receive an uplink cancellation indication from the BS, where the indication identifies slot 1 as cancelled. In this example, the UE may refrain from transmitting portion 1 in slot 1, and may postpone the transmission of portion 1 to slot 2, which may be repurposed for the postponed transmission of portion 1. In this case, the transmissions of portion 2 and portion 3 may also be postponed to accommodate for the transmission of portion 1 in slot 2. For example, portion 2 may then be transmitted in slot 3, and portion 3 may be transmitted in slot 4. Slot 4 may be an uplink cancellation resource that is scheduled or configured based at least in part on the uplink cancellation indication.

In this way, the UE is capable of transmitting portions of a multi-slot PUSCH transmission, that were cancelled by an uplink cancellation indication, in subsequent time-domain resources. Thus, the BS to which the UE transmits the multi-slot PUSCH transmission may receive more (or all) portions of a multi-slot PUSCH transmission than if the UE were to simply drop the portions, which increases the likelihood that the BS will be able to decode the multi-slot PUSCH transmission. Moreover, if the portions of the multi-slot PUSCH transmission that are transmitted in the subsequent time-domain resources include multiplexed UCI, the BS may receive the UCI and may perform HARQ retransmissions based at least in part on the UCI, may adjust channel parameters for improved downlink communication based at least in part on the UCI, and/or the like.

As indicated above, FIGS. 3A-3C are provided as one or more examples. Other examples may differ from what is described with respect to FIGS. 3A-3C.

Figure 4A:
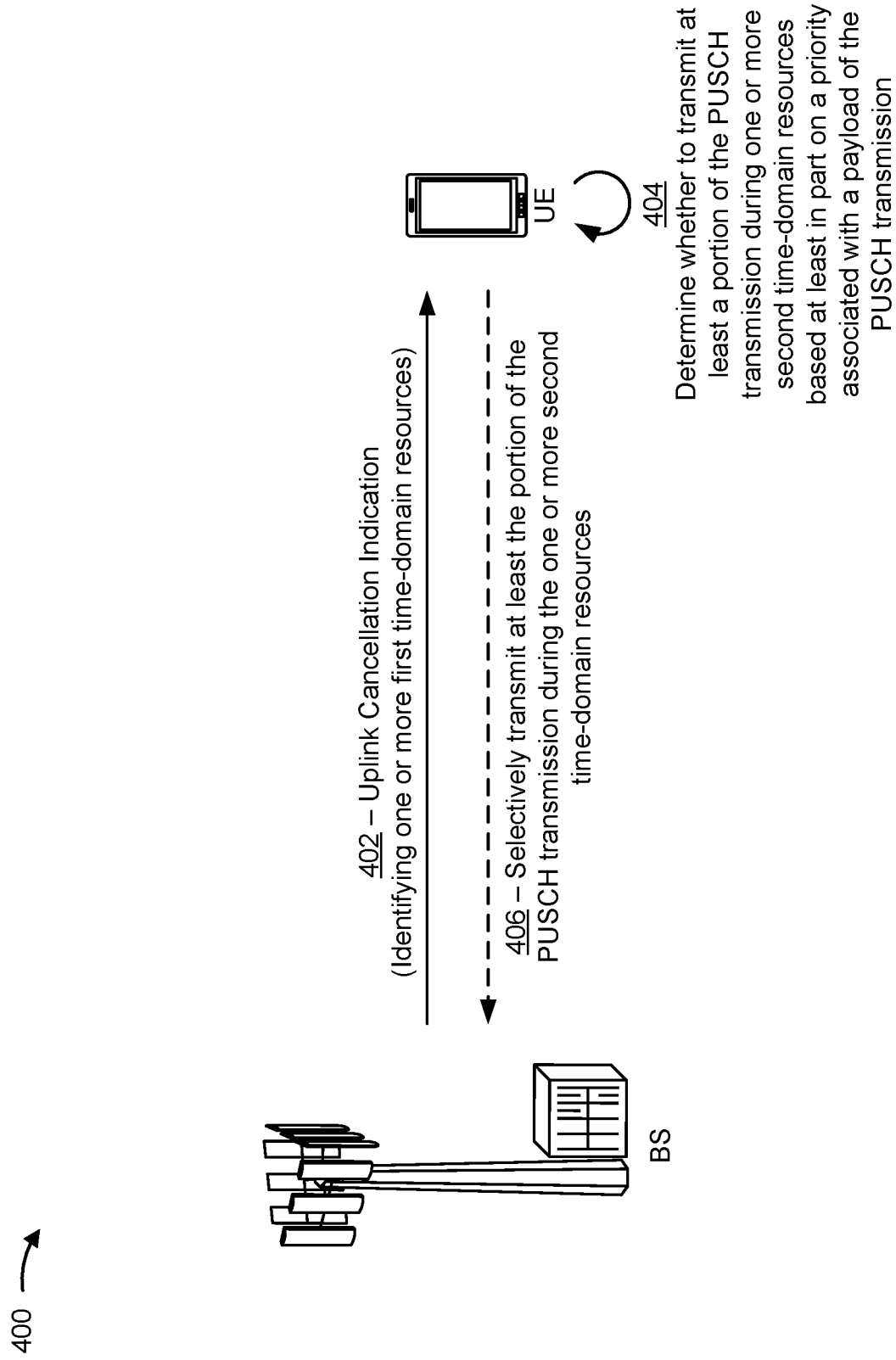
Figure 4B:
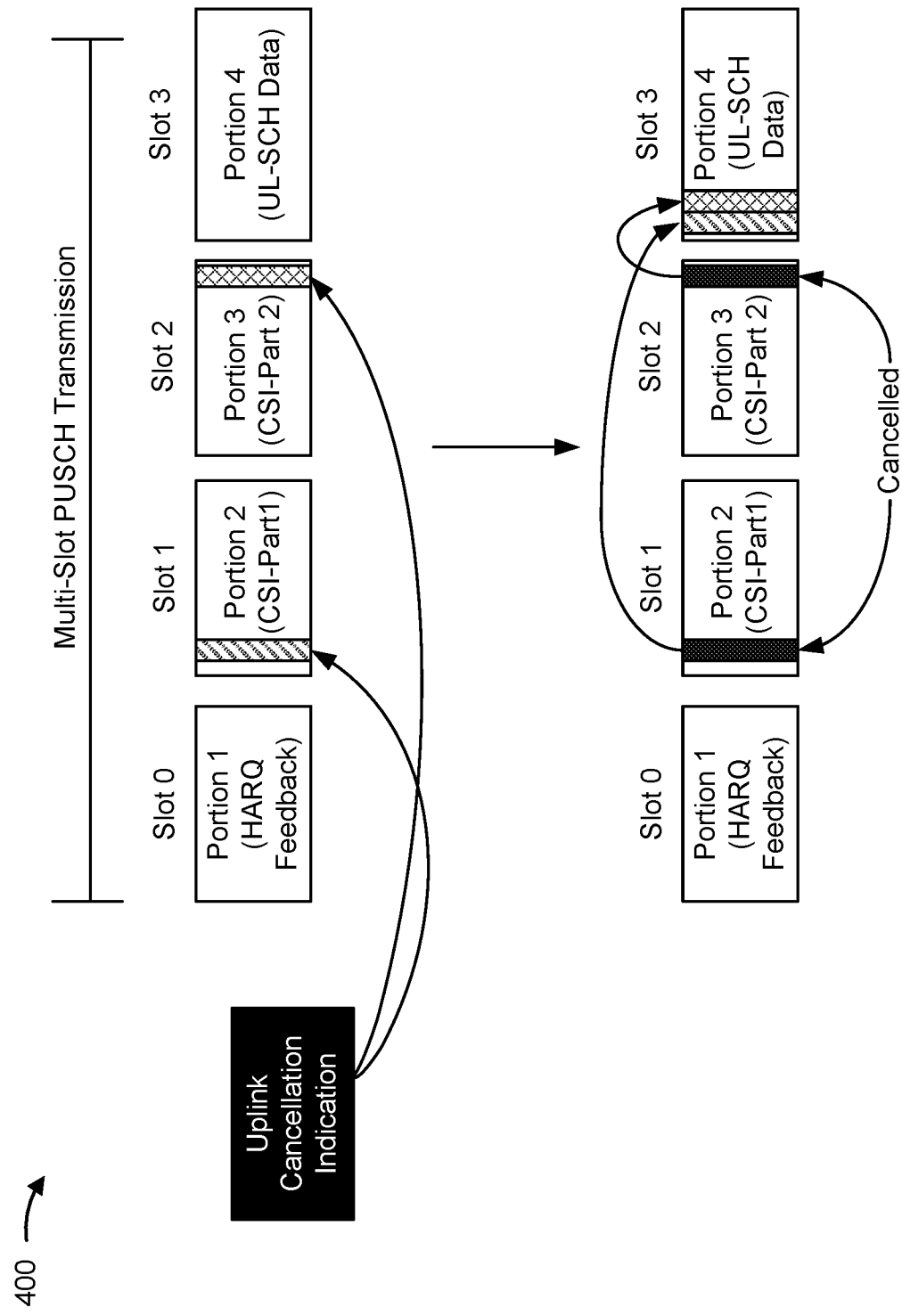
Figure 4C:
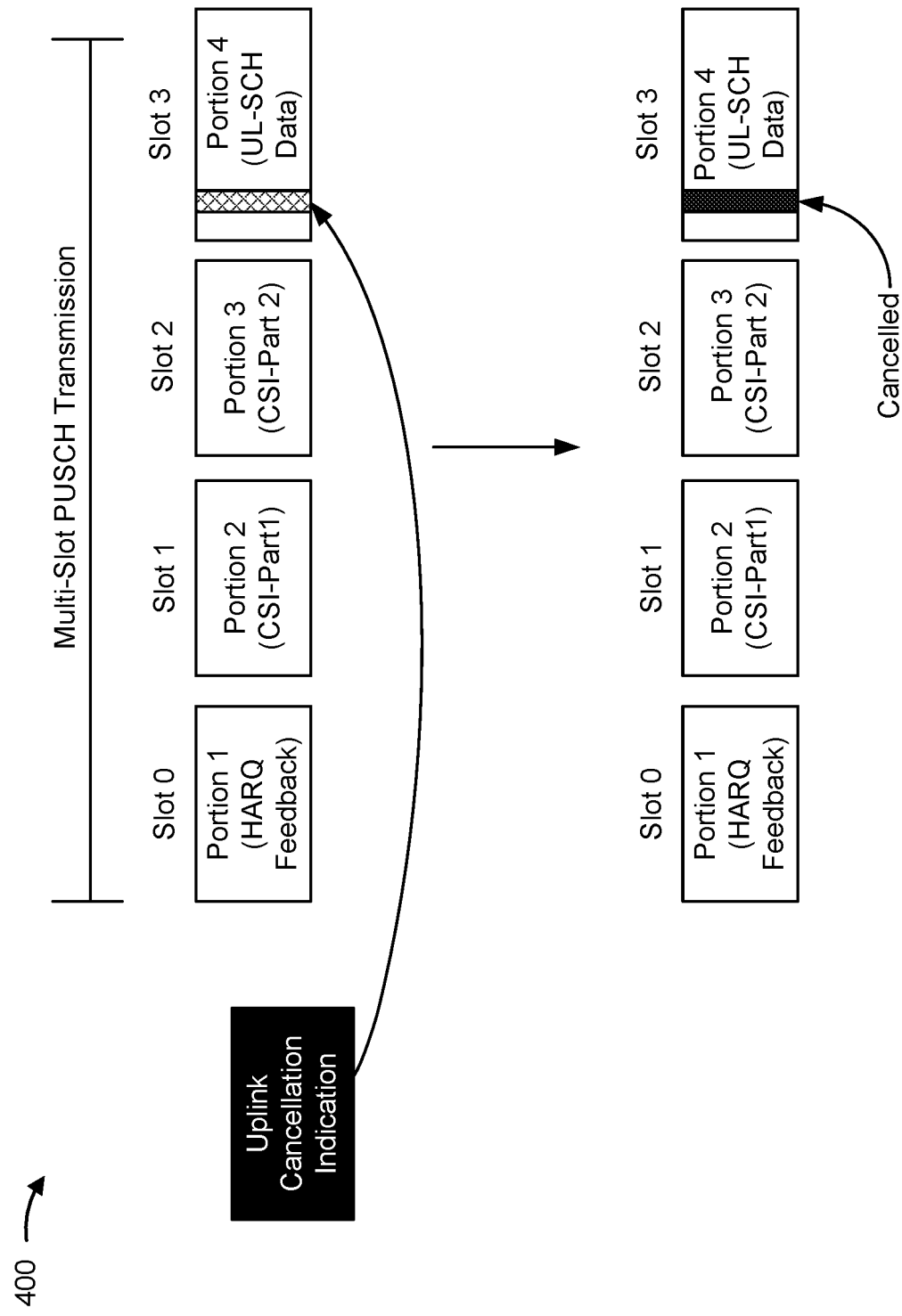

FIGS. 4A-4C are diagrams illustrating one or more examples 400 of uplink preemption for multi-slot uplink UCI multiplexing, in accordance with various aspects of the present disclosure. As shown in FIGS. 4A-4C, example(s) 400 may include communication between a UE (e.g., a UE 120) and a BS (e.g., a BS 110). In some aspects, the UE and the BS may be included in a wireless network (e.g., wireless network 100). In some aspects, the UE and the BS may communicate via an access link, which may include a downlink and an uplink.

In some aspects, the UE may be an NR-Light UE (which may also be referred to as a reduced capability UE), and may multiplex UCI in a PUSCH transmission (e.g., with other UCI, with UL-SCH data, and/or the like), and may transmit the PUSCH transmission to the BS on the uplink. In some aspects, the PUSCH transmission may be a multi-slot PUSCH transmission that spans a plurality of slots or other types of time-domain resources. In this case, the UE may transmit different types of payloads of multi-slot PUSCH transmission in each. For example, the UE may transmit a HARQ feedback payload in a first slot, a CSI-Part1 payload in a second slot, a CSI-Part2 payload in a third slot, a UL-SCH data payload in a fourth slot, and/or the like.

In some aspects, the UE may be capable of transmitting various types of uplink traffic to the BS, such as eMBB traffic, URLLC traffic, and/or the like. In some cases, the UE may be configured or scheduled to transmit uplink traffic in a time-domain resource and/or a frequency-domain resource in which the uplink traffic overlaps with a higher priority uplink transmission or a time-sensitive transmission from another UE. As an example, the UE may be scheduled or configured to transmit eMBB traffic in a time-domain resource and/or a frequency-domain resource of a URLLC transmission from another UE.

As shown in FIG. 4A, and by reference number 402, the UE may receive an uplink cancellation indication that identifies one or more first time-domain resources during which the UE is to refrain from transmitting at least a portion of a multi-slot PUSCH transmission scheduled to be transmitted during the one or more first time-domain resources. In some aspects, the uplink cancellation indication may be included in an uplink grant (e.g., an uplink grant field) in a DCI communication.

The one or more first time-domain resources may be time-domain resources in which the portion of the PUSCH transmission overlaps or collides with another uplink transmission from another UE. For example, the one or more first time-domain resources may identify one or more slots in which the portion of the PUSCH transmission overlaps or collides with the other uplink transmission, may identify one or more symbols within a slot (or a plurality of slots) in which the portion of the PUSCH transmission overlaps or collides with the other uplink transmission, and/or the like.

As further shown in FIG. 4A, and by reference number 404, the UE may determine whether to transmit the portion of the PUSCH transmission during one or more second time-domain resources based at least in part on a priority associated with a payload of the PUSCH transmission. In this case, instead of (or in addition to) scheduling additional resources to accommodate for a postponed transmission of the portion of the PUSCH transmission, the UE may identify another time-domain (e.g., the one or more second time-domain resources) scheduled for another uplink transmission, and may determine whether to puncture the other uplink transmission based at least in part on the priority associated with the payload of the PUSCH transmission.

In some aspects, the UE may identify the one or more second time-domain resources as the next closest time-domain resource(s) in the time domain after the one or more first time-domain resources. In some aspects, a plurality of portions of the PUSCH transmission are to be transmitted in the one or more second time-domain resources (e.g., such that the one or more time-domain resources include a plurality of time-domain resources), and the UE may identify and/or map the transmission of the plurality of portions to a plurality of second time-domain resources using various techniques. For example, the plurality of portions may be mapped in a sequential order in which the plurality of portions occur. In this case, a first portion (e.g., that occurs first in the time domain) may be mapped to the first resource in the plurality of second time-domain resources, a second portion (e.g., that occurs second in the time domain) may be mapped to the second resource in the plurality of second time-domain resources, and so on. As another example, the plurality of portions may be mapped based at least in part on the priority of the respective payload included in each of the plurality of portions. In this case, a first portion with the highest priority payload may be mapped to the first resource in the plurality of second time-domain resources, a second portion with the next highest priority payload may be mapped to the second resource in the plurality of second time-domain resources, and so on.

In some aspects, the UE may determine whether to transmit the portion of the PUSCH transmission during the one or more second time-domain resources by determining whether the priority associated with the payload satisfies a priority threshold. For example, the UE may determine to transmit the portion of the PUSCH transmission during one or more second time-domain resources based at least in part on determining that the priority associated with the payload satisfies the priority threshold. As another example, the UE may determine to refrain from transmitting the portion of the PUSCH transmission in the one or more second time-domain resources (e.g., such that the portion is punctured, dropped, or cancelled in the one or more first time-domain resources without a postponed transmission) based at least in part on determining that the priority associated with the payload does not satisfy the priority threshold.

In some aspects, if the payload type differs across the one or more first time-domain resources for the PUSCH transmission, the UE may determine whether to transmit each portion of the PUSCH transmission in a respective slot based at least in part on the priority associated with the payload of each portion. In this case, some portions of the PUSCH transmission may be transmitted during the one or more second time-domain resources, whereas other portions of the PUSCH transmissions may not be transmitted during the one or more second time-domain resources.

In some aspects, the priority threshold may programmed and/or otherwise configured for the UE. In some aspects, the priority threshold may be indicated to the UE in RRC signaling, may be indicated to the UE in the uplink cancellation indication, and/or the like.

In some aspects, the UE may determine whether to transmit the portion of the PUSCH transmission during the one or more second time-domain resources further based at least in part on a priority associated with a payload of another uplink transmission that is scheduled to be transmitted during the one or more second time-domain resources. For example, the UE may determine to transmit the portion of the PUSCH transmission during the one or more second time-domain resources based at least in part on determining that the priority associated with the payload of the portion of the PUSCH transmission satisfies the priority threshold and that the payload of the other uplink transmission (e.g., which may be another portion of the PUSCH transmission or a portion of another PUSCH transmission) does not satisfy the priority threshold.

As another example, the UE may determine to transmit the portion of the PUSCH transmission during the one or more second time-domain resources based at least in part on determining that the priority associated with the payload of the portion of the PUSCH transmission is greater relative to the priority associated with the payload of the other uplink transmission. In this case, a priority hierarchy may be defined for the different payload types. In the hierarchy, the priorities associated with UCI payloads (e.g., HARQ feedback, CSI-Part1, CSI-Part2, and/or the like) may be greater relative to the priority associated with UL-SCH data. Further, the priority associated with HARQ-ACK may be assigned the highest priority of the UCI payloads, CSI-Part1 may be assigned the next highest priority of the UCI payloads, and CSI-Part2 may be assigned the next highest priority of the UCI payloads. In other examples, the priorities may be different, and may be based at least in part on other parameters such as CSI reporting component priority rules.

As further shown in FIG. 4A, and by reference number 406, the UE may selectively transmit at least the portion of the PUSCH transmission during the one or more second time-domain resources based at least in part on determining to transmit at least the portion of the PUSCH transmission during the one or more second time-domain resources.

As an example, the UE may determine that the priority associated with the payload of the PUSCH transmission satisfies the priority threshold, and may determine that a priority associated with a payload of another PUSCH transmission that is scheduled for the one or more second time-domain resources does not satisfy the priority threshold. The UE may determine to refrain from transmitting the other PUSCH transmission during the one or more second time-domain resources and to transmit the at least the portion of the PUSCH transmission during the one or more second time-domain resources based at least in part on determining that the priority associated with the payload of the PUSCH transmission satisfies the priority threshold and that the priority associated with the payload of the PUSCH transmission does not satisfy the priority threshold. Accordingly, the UE may transmit the at least the portion of the PUSCH transmission during the one or more second time-domain resources. In some aspects, the UE may further refrain from transmitting one or more reference signals that were scheduled to be transmitted during the one or more second time-domain resources.

In some aspects, the UE may determine that the priority associated with the payload of the PUSCH transmission is greater relative to a priority associated with a payload of another PUSCH transmission that is scheduled for the one or more second time-domain resources. Accordingly, the UE may refrain from transmitting the other PUSCH transmission during the one or more second time-domain resources and may transmit the at least the portion of the PUSCH transmission during the one or more second time-domain resources based at least in part on determining that the priority associated with the payload of the PUSCH transmission is greater relative to a priority associated with the payload of the other PUSCH transmission.

In some aspects, the UE may transmit at least the portion of the PUSCH transmission during the one or more second time-domain resources at an increased transmit power relative to the transmit power configured for transmission of the portion of the PUSCH transmission during the one or more first time-domain resources. In some aspects, the increased transmit power may be indicated in the uplink cancellation indication, indicated in RRC signaling to the UE, programmed or configured at the UE, and/or the like. In some aspects, the UE may be configured to transmit at least the portion of the PUSCH transmission during the one or more second time-domain resources at an increased transmit power based at least in part on one or more reference signals being scheduled to be transmitted during the one or more second time-domain resources.

In some aspects, the UE may determine that the priority associated with the payload of the PUSCH transmission does not satisfy a priority threshold and may refrain from transmitting the at least the portion of the PUSCH transmission during the one or more second time-domain resources based at least in part on determining that the priority associated with the payload of the PUSCH transmission does not satisfy the priority threshold. In some aspects, the UE may determine that the priority associated with the payload of the PUSCH transmission is lower relative to a priority associated with a payload of another PUSCH transmission that is scheduled for the one or more second time-domain resources. Accordingly, the UE may refrain from transmitting the at least the portion of the PUSCH transmission during the one or more second time-domain resources based at least in part on determining that the priority associated with the payload of the PUSCH transmission is lower relative to the priority associated with the payload of the other PUSCH transmission.

FIGS. 4B and 4C illustrate respective examples of transmitting at least the portion of the PUSCH transmission during the one or more second time-domain resources. Other example configurations of transmissions may be performed by the UE based at least in part on the techniques described herein.

As shown in FIG. 4B, the UE may be scheduled or configured to transmit portions 1 through 4 of a multi-slot PUSCH transmission across slots 0-3, respectively. The UE may receive an uplink cancellation indication from the BS, where the indication identifies one or more symbols in slot 1 and one or more symbols in slot 2 as cancelled. In this example, the UE may refrain from transmitting portion 2 in slot 1 occupying the one or more symbols in slot 1, and may refrain from transmitting portion 3 in slot 2 occupying the one or more symbols in slot 2. The UE may identify slot 3 as the first slot after the slots affected by the uplink cancellation indication. The UE may determine, based at least in part on the priority of the payload included in portion 2 and the priority of the payload included in portion 3, to postpone the transmission of the one or more cancelled symbols from slot 1 and slot 2 to slot 3. In this example, the UE may determine that the priority of the payload included in portion 2 and the priority of the payload included in portion 3 both satisfy a priority threshold and/or are greater relative to the priority of portion 4 (e.g., which includes a UL-SCH data payload type) to be transmitted in slot 3.

As shown in FIG. 4C, the UE may be scheduled or configured to transmit portions 1 through 4 of a multi-slot PUSCH transmission across slots 0-3, respectively. The UE may receive an uplink cancellation indication from the BS, where the indication identifies one or more symbols in slot 3 as cancelled. In this example, the UE may determine that the priority associated with the payload (e.g., UL-SCH data) to be transmitted in the one or more symbols does not satisfy a priority threshold. Accordingly, the UE may refrain from transmitting portion 4 in the one or more symbols without performing a postponed transmission for the one or more symbols.

In this way, the UE is capable of transmitting portions of a multi-slot PUSCH transmission, that were cancelled by an uplink cancellation indication, in subsequent time-domain resources. Thus, the BS to which the UE transmits the multi-slot PUSCH transmission may receive more (or all) portions of a multi-slot PUSCH transmission than if the UE were to simply drop the portions, which increases the likelihood that the BS will be able to decode the multi-slot PUSCH transmission. Moreover, if the portions of the multi-slot PUSCH transmission that are transmitted in the subsequent time-domain resources include multiplexed UCI, the BS may receive the UCI and may perform HARQ retransmissions based at least in part on the UCI, may adjust channel parameters for improved downlink communication based at least in part on the UCI, and/or the like.

As indicated above, FIGS. 4A-4C are provided as one or more examples. Other examples may differ from what is described with respect to FIGS. 4A-4C.

Figure 5:
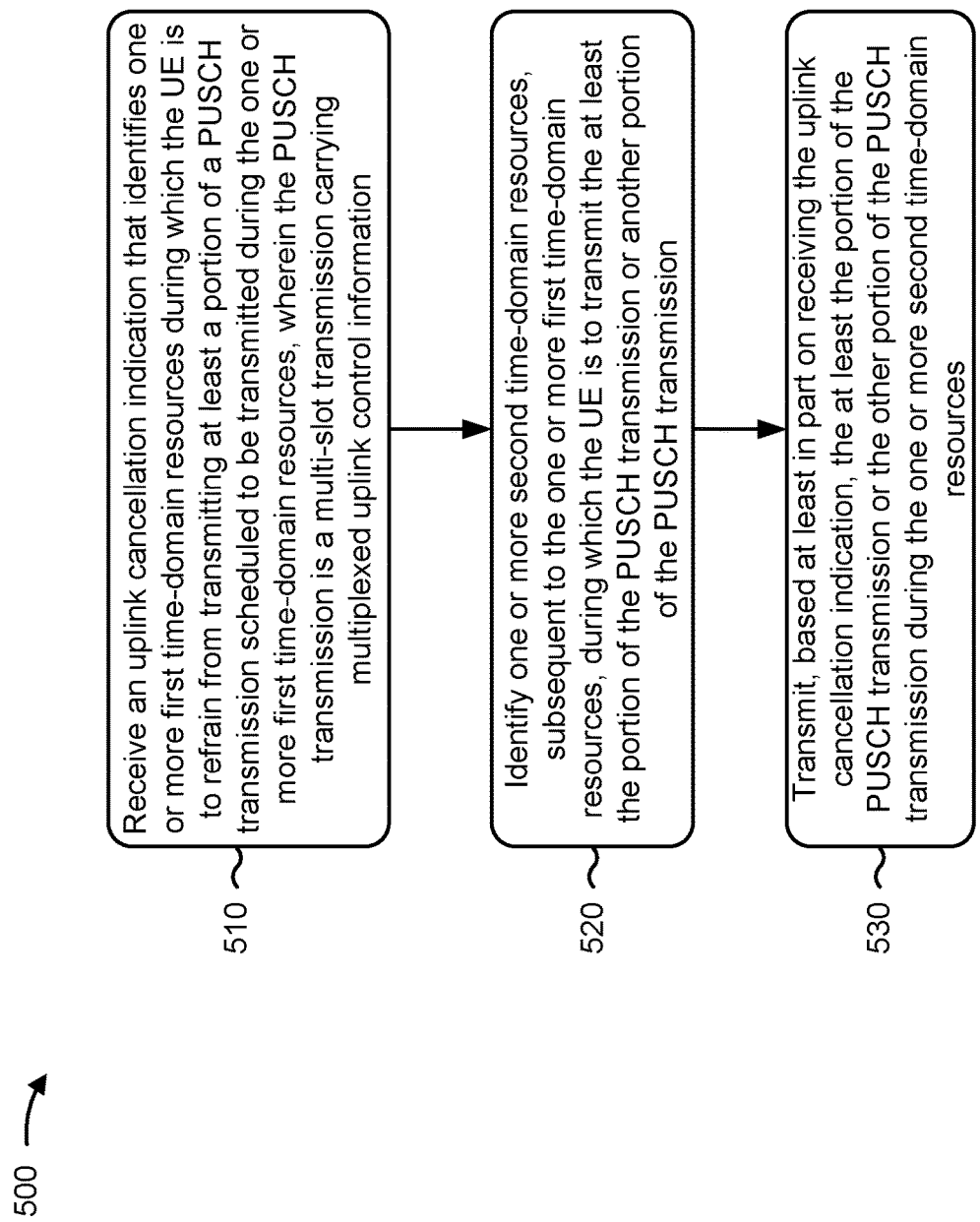
FIGS. 5 and 6 are diagrams illustrating example processes performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with uplink preemption for multi-slot UCI multiplexing.

As shown in FIG. 5, in some aspects, process 500 may include receiving an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information (block 510). For example, the UE (e.g., using receive processor 258, transmit processor 264, controller/processor 280, memory 282, and/or the like) may receive an uplink cancellation indication that identifies one or more first time-domain resources during which the UE is to refrain from transmitting at least a portion of a PUSCH transmission scheduled to be transmitted during the one or more first time-domain resources, as described above. In some aspects, the PUSCH transmission is a multi-slot transmission carrying multiplexed uplink control information.

As further shown in FIG. 5, in some aspects, process 500 may include identifying one or more second time-domain resources, subsequent to the one or more first time-domain resources, during which the UE is to transmit the at least the portion of the PUSCH transmission or another portion of the PUSCH transmission (block 520). For example, the UE (e.g., using receive processor 258, transmit processor 264, controller/processor 280, memory 282, and/or the like) may identify one or more second time-domain resources, subsequent to the one or more first time-domain resources, during which the UE is to transmit the at least the portion of the PUSCH transmission or another portion of the PUSCH transmission, as described above.

As further shown in FIG. 5, in some aspects, process 500 may include transmitting, based at least in part on receiving the uplink cancellation indication, the at least the portion of the PUSCH transmission or the other portion of the PUSCH transmission during the one or more second time-domain resources (block 530). For example, the UE (e.g., using receive processor 258, transmit processor 264, controller/processor 280, memory 282, and/or the like) may transmit, based at least in part on receiving the uplink cancellation indication, the at least the portion of the PUSCH transmission or the other portion of the PUSCH transmission during the one or more second time-domain resources, as described above.

Process 500 may include additional aspects, such as any single aspect or any combination of aspects described below and/or in connection with one or more other processes described elsewhere herein.

In a first aspect, the one or more first time-domain resources and the one or more second time-domain resources each include at least one of one or more slots or one or more symbols. In a second aspect, alone or in combination with the first aspect, a quantity of the one or more second time-domain resources is based at least in part on a quantity of the one or more first time-domain resources. In a third aspect, alone or in combination with one or more of the first and second aspects, the one or more first time-domain resources and the one or more second time-domain resources are both associated with at least one of a same frequency domain resource allocation or a same time domain resource allocation.

In a fourth aspect, alone or in combination with one or more of the first through third aspects, identifying the one or more second time-domain resources includes identifying the one or more second time-domain resources based at least in part on at least one of radio resource control signaling received at the UE or the one or more second time-domain resources being configured for the UE. In a fifth aspect, alone or in combination with one or more of the first through fourth aspects, identifying the one or more second time-domain resources includes identifying the one or more second time-domain resources based at least in part on an explicit indication of the one or more second time-domain resources in the uplink cancellation indication. In a sixth aspect, alone or in combination with one or more of the first through fifth aspects, the uplink cancellation indication is included in an uplink grant in a downlink control information communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
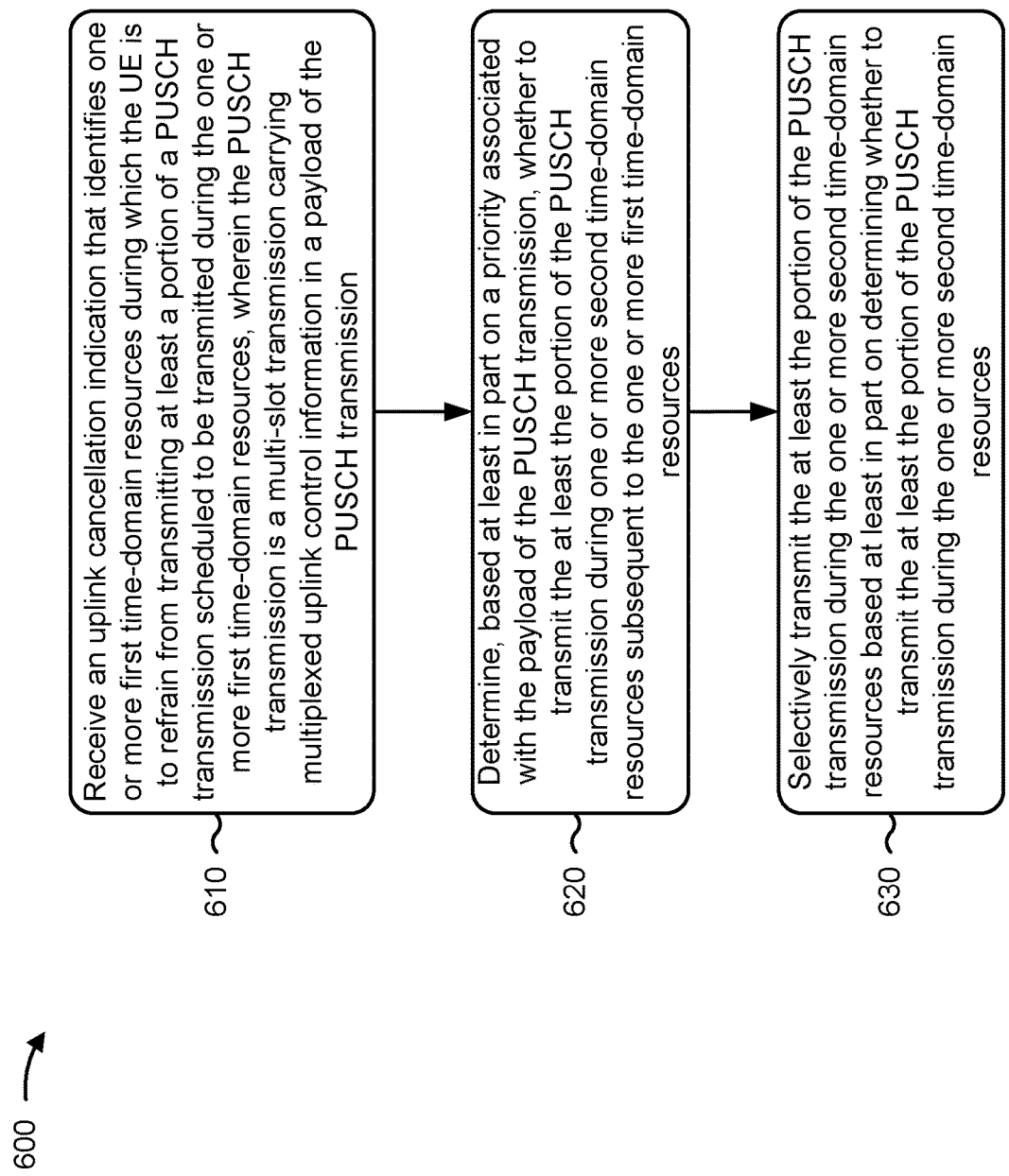

FIG. 6 is a diagram illustrating an example process 600 performed, for example, by a UE, in accordance with various aspects of the present disclosure. Example process 600 is an example where the UE (e.g., a UE 120) performs operations associated with uplink preemption for multi-slot UCI multiplexing.

As shown in FIG. 6, in some aspects, process 600 may include receiving an uplink cancellation indication that identifies one or more first time-domain resources during which the UE is to refrain from transmitting at least a portion of a PUSCH transmission scheduled to be transmitted during the one or more first time-domain resources, wherein the PUSCH transmission is a multi-slot transmission carrying multiplexed uplink control information in a payload of the PUSCH transmission (block 610). For example, the UE (e.g., using receive processor 258, transmit processor 264, controller/processor 280, memory 282, and/or the like) may receive an uplink cancellation indication that identifies one or more first time-domain resources during which the UE is to refrain from transmitting at least a PUSCH transmission scheduled to be transmitted during the one or more first time-domain resources, as described above. In some aspects, the PUSCH transmission is a multi-slot transmission carrying multiplexed uplink control information in a payload of the PUSCH transmission.

As further shown in FIG. 6, in some aspects, process 600 may include determining, based at least in part on a priority associated with the payload of the PUSCH transmission, whether to transmit the at least the portion of the PUSCH transmission during one or more second time-domain resources subsequent to the one or more first time-domain resources (block 620). For example, the UE (e.g., using receive processor 258, transmit processor 264, controller/processor 280, memory 282, and/or the like) may determine, based at least in part on a priority associated with the payload of the PUSCH transmission, whether to transmit the at least the portion of the PUSCH transmission during one or more second time-domain resources subsequent to the one or more first time-domain resources, as described above.

Process 600 may include additional aspects, such as any single aspect or any combination of aspects described below and/or in connection with one or more other processes described elsewhere herein.

In a first aspect, determining whether to transmit the at least the portion of the PUSCH transmission during the one or more second time-domain resources includes determining that the priority associated with the payload of the PUSCH transmission satisfies a priority threshold, determining that a priority associated with a payload of another PUSCH transmission that is scheduled for the one or more second time-domain resources does not satisfy the priority threshold, and, based at least in part on determining that the priority associated with the payload of the PUSCH transmission satisfies the priority threshold and that the priority associated with the payload of the PUSCH transmission does not satisfy the priority threshold, determining to refrain from transmitting the other PUSCH transmission during the one or more second time-domain resources and determining to transmit the at least the portion of the PUSCH transmission during the one or more second time-domain resources. In a second aspect, alone or in combination with the first aspect, the one or more first time-domain resources include a plurality of time-domain resources, and the method further comprises identifying the one or more second time-domain resources based at least in part on the priority associated with the payload of the PUSCH transmission in each of the plurality of time-domain resources.

In a third aspect, alone or in combination with one or more of the first and second aspects, selectively transmitting the at least the portion of the PUSCH transmission during the one or more second time-domain resources includes transmitting, based at least in part on determining to transmit the at least the portion of the PUSCH transmission during the one or more second time-domain resources, the at least the portion of the PUSCH transmission during the one or more second time-domain resources at an increased transmit power, wherein the increased transmit power is at least one of indicated in the uplink cancellation indication, indicated in radio resource control signaling, or configured at the UE.

In a fourth aspect, alone or in combination with one or more of the first through third aspects, process 600 includes refraining, based at least in part on determining to refrain from transmitting the other PUSCH transmission during the one or more second time-domain resources, from transmitting one or more reference signals scheduled to be transmitted during the one or more second time-domain resources. In a fifth aspect, alone or in combination with one or more of the first through fourth aspects, the priority threshold is at least one of indicated in the uplink cancellation indication, indicated in radio resource control signaling, or configured at the UE.

In a sixth aspect, alone or in combination with one or more of the first through fifth aspects, the one or more first time-domain resources include a plurality of time-domain resources, and process 600 further includes identifying the one or more second time-domain resources based at least in part on a sequential order of the plurality of time-domain resources. In a seventh aspect, alone or in combination with one or more of the first through sixth aspects, determining whether to transmit the at least the portion of the PUSCH transmission during the one or more second time-domain resources includes determining that the priority associated with the payload of the PUSCH transmission does not satisfy a priority threshold and determining, based at least in part on determining that the priority associated with the payload of the PUSCH transmission does not satisfy the priority threshold, to refrain from transmitting the at least the portion of the PUSCH transmission during the one or more second time-domain resources.

In an eighth aspect, alone or in combination with one or more of the first through seventh aspects, selectively transmitting the at least the portion of the PUSCH transmission during the one or more second time-domain resources includes refraining, based at least in part on determining to refrain from transmitting the at least the portion of the PUSCH transmission during the one or more second time-domain resources, from transmitting the at least the portion of the PUSCH transmission during the one or more second time-domain resources. In a ninth aspect, alone or in combination with one or more of the first through eighth aspects, determining whether to transmit the at least the portion of the PUSCH transmission during the one or more second time-domain resources includes determining that the priority associated with the payload of the PUSCH transmission is greater relative to a priority associated with a payload of another PUSCH transmission that is scheduled for the one or more second time-domain resources, and based at least in part on determining that the priority associated with the payload of the PUSCH transmission is greater relative to a priority associated with the payload of the other PUSCH transmission, determining to refrain from transmitting the other PUSCH transmission during the one or more second time-domain resources and determining to transmit the at least the portion of the PUSCH transmission during the one or more second time-domain resources.

In a tenth aspect, alone or in combination with one or more of the first through ninth aspects, the priority associated with the payload of the PUSCH transmission is based at least in part on a payload type of the payload of the PUSCH transmission, and the priority associated with the payload of the other PUSCH transmission is based at least in part on a payload type of the payload of the other PUSCH transmission. In an eleventh aspect, alone or in combination with one or more of the first through tenth aspects, the payload type of the payload of the PUSCH transmission is a hybrid automatic repeat request acknowledgement, and the payload type of the payload of the other PUSCH transmission is a channel state information part 1, a channel state information part 2, or uplink scheduled data.

In a twelfth aspect, alone or in combination with one or more of the first through eleventh aspects, the payload type of the payload of the PUSCH transmission is a channel state information part 1, and the payload type of the payload of the other PUSCH transmission is a channel state information part 2 or uplink scheduled data. In a thirteenth aspect, alone or in combination with one or more of the first through twelfth aspects, the payload type of the payload of the PUSCH transmission is a channel state information part 2, and the payload type of the payload of the other PUSCH transmission is uplink scheduled data.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an uplink cancellation indication that identifies one or more first time-domain resources during which the UE is to refrain from transmitting at least a portion of a physical uplink shared channel (PUSCH) transmission scheduled to be transmitted during the one or more first time-domain resources,
      wherein the PUSCH transmission spans a plurality of slots, the PUSCH transmission carrying uplink control information multiplexed with other uplink control information;
   identifying one or more second time-domain resources, subsequent to the one or more first time-domain resources, during which the UE is to transmit the at least the portion of the PUSCH transmission or another portion of the PUSCH transmission, wherein the one or more second time-domain resources are indicated in radio resource control signaling; and
   transmitting the at least the portion of the PUSCH transmission or the other portion of the PUSCH transmission during the one or more second time-domain resources based at least in part on a determination that a priority associated with a payload of the at least the portion of the PUSCH transmission satisfies a priority threshold, wherein the priority threshold is at least one of: indicated in the uplink cancellation indication, or indicated in the radio resource control signaling.

2. The method of claim 1, wherein the one or more first time-domain resources and the one or more second time-domain resources each include at least one of:
   one or more slots, or
   one or more symbols.

3. The method of claim 1, wherein a quantity of the one or more second time-domain resources is based at least in part on a quantity of the one or more first time-domain resources.

4. The method of claim 1, wherein the one or more first time-domain resources and the one or more second time-domain resources are both associated with at least one of:
   a same frequency domain resource allocation, or
   a same time domain resource allocation.

5. The method of claim 1, wherein identifying the one or more second time-domain resources comprises:
   identifying the one or more second time-domain resources based at least in part on an explicit indication of the one or more second time-domain resources.

6. The method of claim 1, wherein the uplink cancellation indication is included in an uplink grant in a downlink control information communication.

7. A method of wireless communication performed by a user equipment (UE), comprising:
   receiving an uplink cancellation indication that identifies one or more first time-domain resources during which the UE is to refrain from transmitting at least a portion of a physical uplink shared channel (PUSCH) transmission scheduled to be transmitted during the one or more first time-domain resources,
      wherein the PUSCH transmission carries uplink control information in a payload of the PUSCH transmission, the PUSCH transmission spans a plurality of slots, and the uplink control information is multiplexed with other uplink control information;
   determining whether to transmit the at least the portion of the PUSCH transmission during one or more second time-domain resources subsequent to the one or more first time-domain resources, wherein the one or more second time-domain resources are indicated in radio resource control signaling, wherein determining whether to transmit the at least the portion of the PUSCH transmission during the one or more second time-domain resources comprises determining whether a priority associated with the payload of the at least the portion of the PUSCH transmission satisfies a priority threshold, and wherein the priority threshold is at least one of: indicated in the uplink cancellation indication, or indicated in the radio resource control signaling; and
   selectively transmitting the at least the portion of the PUSCH transmission during the one or more second time-domain resources based at least in part on determining whether to transmit the at least the portion of the PUSCH transmission during the one or more second time-domain resources.

8. The method of claim 7, wherein determining whether to transmit the at least the portion of the PUSCH transmission during the one or more second time-domain resources further comprises:
   determining that a priority associated with a payload of another PUSCH transmission that is scheduled for the one or more second time-domain resources does not satisfy the priority threshold; and
   based at least in part on determining that the priority associated with the payload of the PUSCH transmission satisfies the priority threshold and that the priority associated with the payload of the PUSCH transmission does not satisfy the priority threshold:
      determining to refrain from transmitting the other PUSCH transmission during the one or more second time-domain resources, and determining to transmit the at least the portion of the PUSCH transmission during the one or more second time-domain resources.

9. The method of claim 8, wherein the one or more first time-domain resources include a plurality of time-domain resources; and
wherein the method further comprises:
identifying the one or more second time-domain resources based at least in part on the priority associated with the payload of the PUSCH transmission in each of the plurality of time-domain resources.

10. The method of claim 8, wherein selectively transmitting the at least the portion of the PUSCH transmission during the one or more second time-domain resources comprises:
transmitting, based at least in part on determining to transmit the at least the portion of the PUSCH transmission during the one or more second time-domain resources, the at least the portion of the PUSCH transmission during the one or more second time-domain resources at an increased transmit power,
wherein the increased transmit power is at least one of:
indicated in the uplink cancellation indication,
indicated in the radio resource control signaling, or
configured at the UE.

11. The method of claim 8, further comprising:
refraining, based at least in part on determining to refrain from transmitting the other PUSCH transmission during the one or more second time-domain resources, from transmitting one or more reference signals scheduled to be transmitted during the one or more second time-domain resources.

12. The method of claim 7, wherein the one or more first time-domain resources include a plurality of time-domain resources; and
wherein the method further comprises:
identifying the one or more second time-domain resources based at least in part on a sequential order of the plurality of time-domain resources.

13. The method of claim 7, wherein determining whether to transmit the at least the portion of the PUSCH transmission during the one or more second time-domain resources comprises:
determining that the priority associated with the payload of the PUSCH transmission does not satisfy a priority threshold; and
determining, based at least in part on determining that the priority associated with the payload of the PUSCH transmission does not satisfy the priority threshold, to refrain from transmitting the at least the portion of the PUSCH transmission during the one or more second time-domain resources.

14. The method of claim 13, wherein selectively transmitting the at least the portion of the PUSCH transmission during the one or more second time-domain resources comprises:
refraining, based at least in part on determining to refrain from transmitting the at least the portion of the PUSCH transmission during the one or more second time-domain resources, from transmitting the at least the portion of the PUSCH transmission during the one or more second time-domain resources.

15. The method of claim 7, wherein determining whether to transmit the at least the portion of the PUSCH transmission during the one or more second time-domain resources comprises:
determining that the priority associated with the payload of the PUSCH transmission is greater relative to a priority associated with a payload of another PUSCH transmission that is scheduled for the one or more second time-domain resources; and
based at least in part on determining that the priority associated with the payload of the PUSCH transmission is greater relative to a priority associated with the payload of the other PUSCH transmission:
determining to refrain from transmitting the other PUSCH transmission during the one or more second time-domain resources, and
determining to transmit the at least the portion of the PUSCH transmission during the one or more second time-domain resources.

16. The method of claim 15, wherein the priority associated with the payload of the PUSCH transmission is based at least in part on a payload type of the payload of the PUSCH transmission; and
wherein the priority associated with the payload of the other PUSCH transmission is based at least in part on a payload type of the payload of the other PUSCH transmission.

17. The method of claim 16, wherein the payload type of the payload of the PUSCH transmission is a hybrid automatic repeat request acknowledgement; and
wherein the payload type of the payload of the other PUSCH transmission is:
a channel state information part 1,
a channel state information part 2, or
uplink scheduled data.

18. The method of claim 16, wherein the payload type of the payload of the PUSCH transmission is a channel state information part 1; and
wherein the payload type of the payload of the other PUSCH transmission is:
a channel state information part 2, or
uplink scheduled data.

19. The method of claim 16, wherein the payload type of the payload of the PUSCH transmission is a channel state information part 2; and
wherein the payload type of the payload of the other PUSCH transmission is uplink scheduled data.

20. A user equipment (UE) for wireless communication, comprising:
one or more memories; and
one or more processors coupled to the one or more memories, the one or more processors individually or collectively configured to cause the UE to:
receive an uplink cancellation indication that identifies one or more first time-domain resources during which the UE is to refrain from transmitting at least a portion of a physical uplink shared channel (PUSCH) transmission scheduled to be transmitted during the one or more first time-domain resources, wherein the PUSCH transmission spans a plurality of slots, the PUSCH transmission carrying uplink control information multiplexed with other uplink control information;
identify one or more second time-domain resources, subsequent to the one or more first time-domain resources, during which the UE is to transmit the at least the portion of the PUSCH transmission or another portion of the PUSCH transmission, wherein the one or more second time-domain resources are indicated in radio resource control signaling; and transmit the at least the portion of the PUSCH transmission or the other portion of the PUSCH transmission during the one or more second time-domain resources based at least in part on a determination that a priority associated with a payload of the at least the portion of the PUSCH transmission satisfies a priority threshold, wherein the priority threshold is at least one of: indicated in the uplink cancellation indication, or indicated in the radio resource control signaling.

21. The UE of claim 20, wherein the one or more first time-domain resources and the one or more second time-domain resources are both associated with at least one of:
a same frequency domain resource allocation, or
a same time domain resource allocation.

22. The UE of claim 20, wherein the one or more processors, to identify the one or more second time-domain resources, are configured to:
identify the one or more second time-domain resources based at least in part on an explicit indication of the one or more second time-domain resources.

23. The UE of claim 20, wherein the one or more processors, to transmit the at least the portion of the PUSCH transmission during the one or more second time-domain resources, are configured to:
transmit at an increased transmit power, wherein the increased transmit power is at least one of:
indicated in the uplink cancellation indication,
indicated in the radio resource control signaling, or
configured at the UE.

24. A user equipment (UE) for wireless communication, comprising:
one or more memories; and
one or more processors coupled to the one or more memories, the one or more processors individually or collectively configured to cause the UE to:
receive an uplink cancellation indication that identifies one or more first time-domain resources during which the UE is to refrain from transmitting at least a portion of a physical uplink shared channel (PUSCH) transmission scheduled to be transmitted during the one or more first time-domain resources;
determine whether to transmit the at least the portion of the PUSCH transmission during one or more second time-domain resources subsequent to the one or more first time-domain resources based at least in part on whether a priority associated with a payload of the at least the portion of the PUSCH transmission satisfies a priority threshold, wherein the one or more second time-domain resources are indicated in radio resource control signaling, and wherein the priority threshold is at least one of: indicated in the uplink cancellation indication, or indicated in the radio resource control signaling; and
selectively transmit the at least the portion of the PUSCH transmission during the one or more second time-domain resources based at least in part on determining whether to transmit the at least the portion of the PUSCH transmission during the one or more second time-domain resources.

25. The UE of claim 24, wherein the one or more processors, to determine whether to transmit the at least the portion of the PUSCH transmission during the one or more second time-domain resources, are configured to:
determine that the priority associated with the payload of the PUSCH transmission satisfies a priority threshold;
determine that a priority associated with a payload of another PUSCH transmission that is scheduled for the one or more second time-domain resources does not satisfy the priority threshold; and
based at least in part on determining that the priority associated with the payload of the PUSCH transmission satisfies the priority threshold and that the priority associated with the payload of the PUSCH transmission does not satisfy the priority threshold:
determine to refrain from transmitting the other PUSCH transmission during the one or more second time-domain resources, and
determine to transmit the at least the portion of the PUSCH transmission during the one or more second time-domain resources.

26. The UE of claim 24, wherein the one or more first time-domain resources include a plurality of time-domain resources; and
wherein the one or more processors are further configured to:
identify the one or more second time-domain resources based at least in part on a sequential order of the plurality of time-domain resources.

27. The UE of claim 24, wherein the one or more processors, to determine whether to transmit the at least the portion of the PUSCH transmission during the one or more second time-domain resources, are configured to:
determine that the priority associated with the payload of the PUSCH transmission does not satisfy a priority threshold; and
determine, based at least in part on determining that the priority associated with the payload of the PUSCH transmission does not satisfy the priority threshold, to refrain from transmitting the at least the portion of the PUSCH transmission during the one or more second time-domain resources.

28. The UE of claim 24, wherein the one or more processors, to determine whether to transmit the at least the portion of the PUSCH transmission during the one or more second time-domain resources, are further configured to:
determine that the priority associated with the payload of the PUSCH transmission is greater relative to a priority associated with a payload of another PUSCH transmission that is scheduled for the one or more second time-domain resources; and
based at least in part on determining that the priority associated with the payload of the PUSCH transmission is greater relative to a priority associated with the payload of the other PUSCH transmission:
determine to refrain from transmitting the other PUSCH transmission during the one or more second time-domain resources, and
determine to transmit the at least the portion of the PUSCH transmission during the one or more second time-domain resources.

29. The UE of claim 24, wherein the one or more processors, to selectively transmit the at least the portion of the PUSCH transmission during the one or more second time-domain resources, are configured to:
transmit at an increased transmit power, wherein the increased transmit power is at least one of:
indicated in the uplink cancellation indication,
indicated in the radio resource control signaling, or
configured at the UE.

30. The UE of claim 24, wherein the PUSCH transmission spans a plurality of slots.

\* \* \* \* \*